United States Patent
Suyama

(10) Patent No.: US 9,587,950 B2
(45) Date of Patent: *Mar. 7, 2017

(54) CARRIER

(71) Applicant: MURATA MACHINERY, LTD., Kyoto-shi, Kyoto (JP)

(72) Inventor: Norihiko Suyama, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/833,310

(22) Filed: Aug. 24, 2015

(65) Prior Publication Data

US 2016/0061608 A1 Mar. 3, 2016

(30) Foreign Application Priority Data

Aug. 28, 2014 (JP) .................................. 2014-173728

(51) Int. Cl.
| | | |
|---|---|---|
| G01C 21/20 | (2006.01) | |
| G05D 1/00 | (2006.01) | |
| G01S 17/42 | (2006.01) | |
| G01S 17/89 | (2006.01) | |
| G01S 17/93 | (2006.01) | |
| G01S 7/48 | (2006.01) | |

(52) U.S. Cl.
CPC .......... *G01C 21/206* (2013.01); *G01S 7/4808* (2013.01); *G01S 17/42* (2013.01); *G01S 17/89* (2013.01); *G01S 17/936* (2013.01); *G05D 1/0088* (2013.01)

(58) Field of Classification Search
CPC ................ G01C 21/005; G01C 21/206; G05D 2201/0216; G05D 1/0274; G05D 1/0244; G05D 1/0088; G01S 7/4808; G01S 17/89; G01S 17/936; G01S 17/42
See application file for complete search history.

(56) References Cited

U.S. PATENT DOCUMENTS

| | | | |
|---|---|---|---|
| 4,494,200 A | 1/1985 | Lam | |
| 4,653,002 A | 3/1987 | Barry | |

(Continued)

FOREIGN PATENT DOCUMENTS

| | | | |
|---|---|---|---|
| JP | 08-152323 A | 6/1996 | |
| JP | 8-335264 A | 12/1996 | |

(Continued)

*Primary Examiner* — Yuen Wong
(74) *Attorney, Agent, or Firm* — Keating & Bennett, LLP

(57) ABSTRACT

In a carrier in which its position is obtained by detecting reflected light using a distance measuring sensor, the position of the carrier is able to be accurately identified in all circumstances. A distance measuring sensor of the carrier is provided in a carrier main body, and measures an intensity of reflected light a plurality of times to obtain a plurality of pieces of measured data. A map database stores map data in which columns provided on a pathway are recorded. A position calculator calculates center points based on a set of measured data having a light intensity greater than or equal to a predetermined threshold among the plurality of pieces of measured data, and then calculates a position of the carrier main body by matching a straight line connecting a plurality of the sets to a straight line of the map data using the center points.

3 Claims, 14 Drawing Sheets

(56) References Cited

U.S. PATENT DOCUMENTS

| | | | |
|---|---|---|---|
| 4,796,198 | A | 1/1989 | Boultinghouse et al. |
| 4,815,008 | A | 3/1989 | Kadonoff et al. |
| 5,051,906 | A | 9/1991 | Evans et al. |
| 5,341,437 | A | 8/1994 | Nakayama |
| 5,390,118 | A | 2/1995 | Margolis et al. |
| 5,911,767 | A | 6/1999 | Garibotto et al. |
| 5,938,710 | A | 8/1999 | Lanza et al. |
| 6,629,028 | B2 | 9/2003 | Paromtchik et al. |
| 6,879,878 | B2 | 4/2005 | Glenn et al. |
| 7,684,916 | B2 | 3/2010 | Wei et al. |
| 7,765,027 | B2 | 7/2010 | Hong et al. |
| 7,792,622 | B2 | 9/2010 | Wei et al. |
| 7,916,898 | B2 | 3/2011 | Anderson |
| 9,062,975 | B2 | 6/2015 | Suyama |
| 2002/0099481 | A1 | 7/2002 | Mori |
| 2006/0074532 | A1 | 4/2006 | Hong |
| 2007/0005208 | A1 | 1/2007 | Han et al. |
| 2007/0271013 | A1 | 11/2007 | Jochem et al. |
| 2011/0066313 | A1 | 3/2011 | Larsson et al. |
| 2011/0153139 | A1 | 6/2011 | Erb et al. |
| 2011/0178669 | A1 | 7/2011 | Tanaka et al. |
| 2011/0270518 | A1 | 11/2011 | Nguyen |
| 2011/0301800 | A1 | 12/2011 | Furuno et al. |
| 2012/0101695 | A1 | 4/2012 | Han et al. |
| 2012/0239239 | A1 | 9/2012 | Suyama |
| 2013/0054129 | A1 | 2/2013 | Wong et al. |
| 2013/0204482 | A1* | 8/2013 | Suyama ............... G01C 21/005 701/28 |

FOREIGN PATENT DOCUMENTS

| | | |
|---|---|---|
| JP | 2010-086416 A | 4/2010 |
| JP | 2011-253414 A | 12/2011 |
| JP | 2013-161399 A | 8/2013 |

\* cited by examiner

FIG. 9A
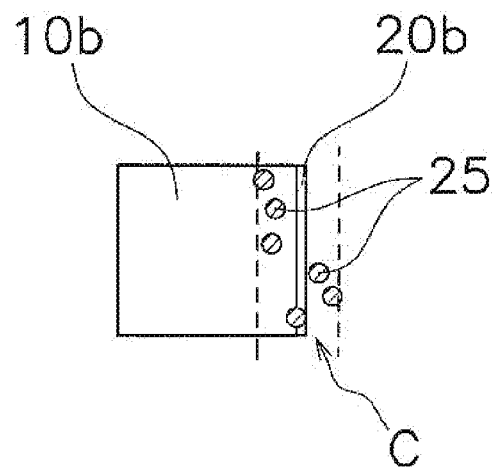
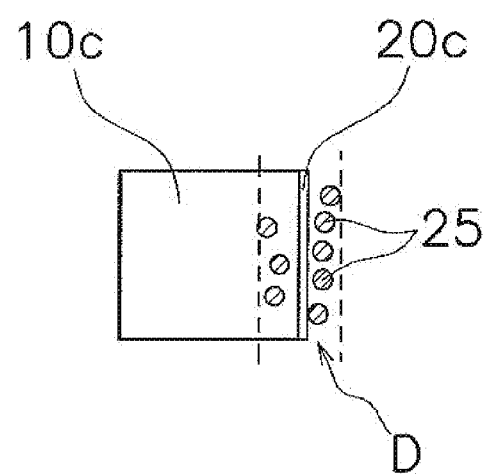

CARRIER

BACKGROUND OF THE INVENTION

1. Field of the Invention

The present invention relates to a carrier, and more particularly, to a carrier that automatically travels on a pathway.

2. Description of the Related Art

In the related art, a carrier that travels on a pathway is known. Such a carrier includes, for example, an environmental map storage, a distance measuring sensor, and a control unit.

The environmental map storage stores an environmental map that indicates an area where structures constituting a pathway are present and an area where the structures are not present. The distance measuring sensor is provided, for example, in front of the carrier and scans laser light, for example, over a range of 190 degrees in front of the carrier. Thus, the distance measuring sensor obtains positional data of reflectors based on reflected light from the structures constituting the pathway and obtains pathway information. The control unit calculates a position of the carrier by matching the obtained pathway information to the environmental map.

There is known a carrier that calculates a position of a carrier main body by detecting reflecting plates attached to rack columns, in particular, for the purpose of obtaining an accurate position of the carrier (e.g., refer to JP 2013-161399 A).

When an approximate line as the pathway information is matched to a line segment of the environmental map in the carrier described above, geometrical characteristics (e.g., corners) of both data are overlapped with each other so that the relative position and orientation of the both data are calculated. Therefore, when three columns are arranged, for example, in a straight line in the scanning area of the laser light, it is difficult to identify the position of the carrier.

SUMMARY OF THE INVENTION

Preferred embodiments of the present invention provide a carrier that identifies its position when a plurality of target objects are arranged so as not to form a plurality of straight lines perpendicular to each other in a scanning area of laser light of the carrier, in the carrier in which its position is obtained by detecting reflected light using a distance measuring sensor.

A carrier according to an aspect of various preferred embodiments of the present invention includes a carrier main body, a distance measuring sensor, a map data storage, and a position calculator.

The carrier main body travels on a pathway.

The distance measuring sensor is provided in the carrier main body, and measures reflected light intensity a plurality of times to obtain a plurality of pieces of measured data.

The map data storage stores map data on which structures provided along the pathway are recorded.

The position calculator calculates a reference point based on a set of measured data having a light intensity greater than or equal to a predetermined threshold among the plurality of pieces of measured data, and then calculates a position of the carrier main body by matching a straight line connecting a plurality of the sets to a straight line of the map data using the reference point. The reference point is a point to be derived from the set of measured data and it is, for example, an average point in plane coordinates.

In the carrier, the reference point that has been calculated from the set of measured data having a light intensity greater than or equal to the predetermined threshold among the plurality of pieces of measured data is used to calculate the position of the carrier main body by matching the straight line connecting the sets to the straight line of the map data. Thus, the position calculator is able to identify the position of the carrier main body when target objects are arranged so as not to form a plurality of straight lines perpendicular to each other in the scanning area of laser light.

The position calculator may connect a plurality of the reference points to create the straight line.

In the carrier, the straight line is obtained by connecting the plurality of reference points and the position calculator compares the straight line with the straight line of the map data to calculate the slope between the straight lines.

The position calculator need not select a straight line outside a predetermined length range as the straight line to be matched to the map data.

In the carrier, the position calculator does not include the straight line outside a predetermined length range as the straight line to be matched to the map data. Accordingly, unnecessary matching operation is not performed, and computational complexity of the position calculation is reduced.

The position calculator may create a straight line for each two adjacent reference points.

In the carrier, the position calculator creates a straight line for each two adjacent reference points. That is, when three adjacent points are present, two straight lines are created. Therefore, the reference points are easily selected to create the straight lines, and thus, the computational complexity of the position calculation is reduced.

The reference point may be a center point of each set of the measured data having a light intensity greater than or equal to the predetermined threshold among the plurality of pieces of measured data.

In the carrier according to various preferred embodiments of the present invention, the reference point that has been calculated from the set of measured data having a light intensity greater than or equal to the predetermined threshold among the plurality of pieces of measured data is used to calculate the position of the carrier main body by matching the straight line connecting the sets to the map data. Thus, the position calculator is able to identify the position of the carrier when the target objects are arranged so as not to form a plurality of straight lines perpendicular to each other in the scanning area of the laser light.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 9A and 9B are explanatory views illustrating sets of measured data used to calculate an approximate line in a traveling area, where FIG. 9A illustrates the sets of measured data and FIG. 9B illustrates the approximate line.

DETAILED DESCRIPTION OF THE PREFERRED EMBODIMENTS

Figure 1:
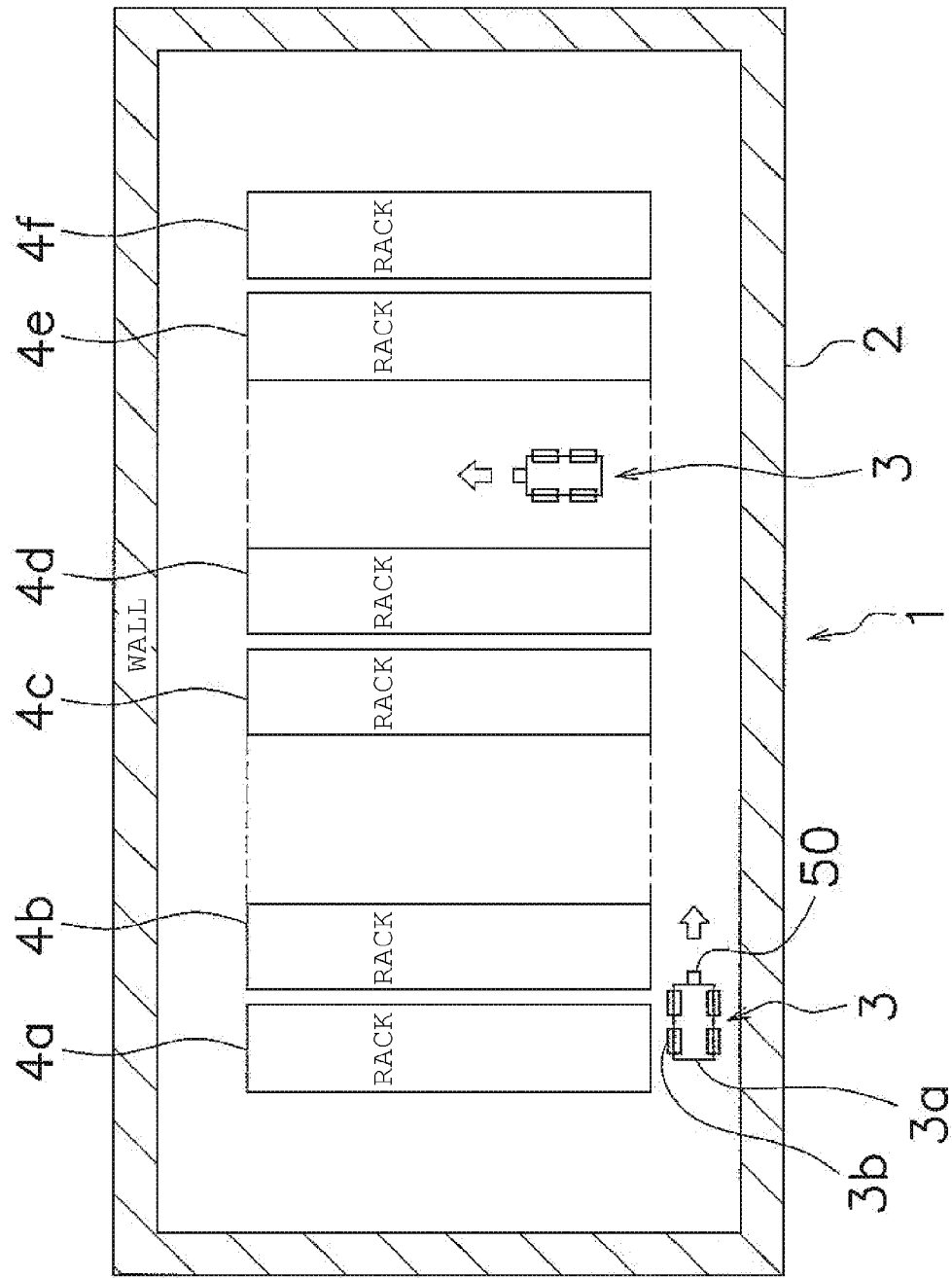
FIG. 1 is a plan view of a carrier system.
Figure 2:
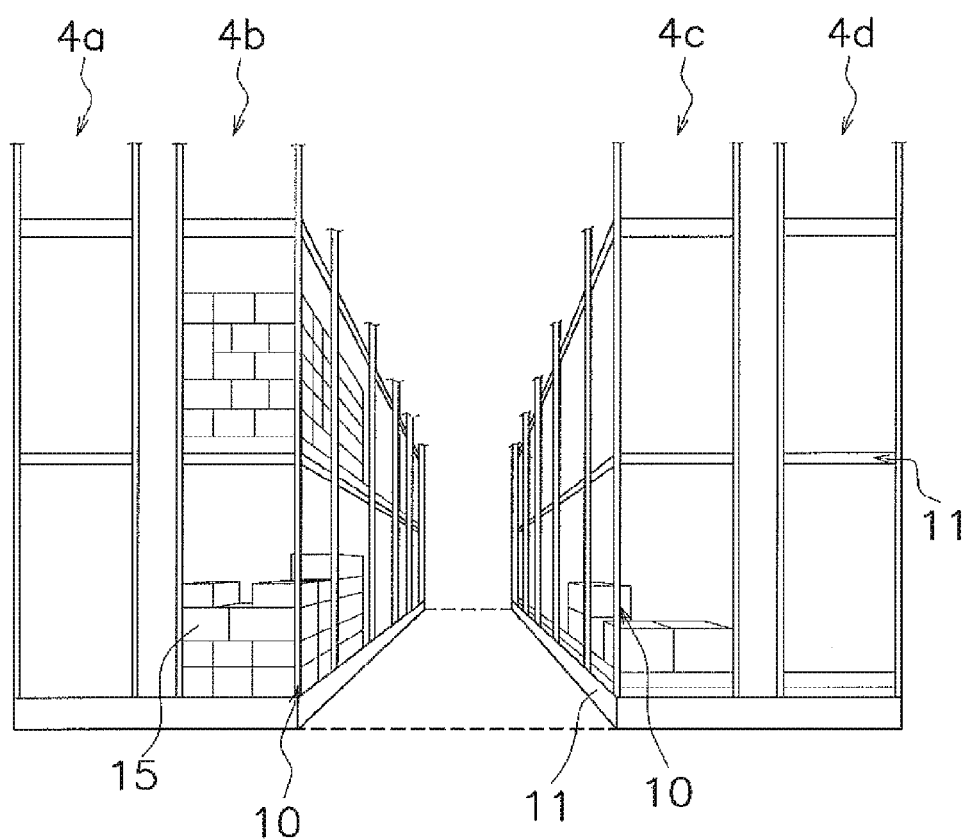
FIG. 2 is an explanatory view illustrating a state where loads are placed on a rack.

A configuration of a carrier system is described with reference to FIGS. 1 and 2. FIG. 1 is a plan view of the carrier system. FIG. 2 is an explanatory view illustrating a state where loads are placed on a rack.

As illustrated in FIG. 1, a carrier system 1 is preferably provided in a room surrounded by a wall 2, for example. The carrier system 1 includes racks 4a, 4b, 4c, 4d, 4e, and 4f on which the loads are placed, and a carrier 3 that travels in a traveling area.

Racks 4 are arranged, for example, in sets of two racks 4. In FIG. 1, the racks 4a and 4b adjacent to each other are arranged as a set. Similarly, the racks 4c and 4d are arranged as a set and the racks 4e and 4f are arranged as a set. As illustrated in FIG. 2, a plurality of columns 10a, 10b, 10c, etc. and floor plates 11 are combined, so that the rack 4 is configured to define a plurality of storage shelves horizontally and vertically. Loads 15 having various sizes are able to be placed on the storage shelves.

The traveling area is a pathway on which the carrier 3 travels. The load is stored into and retrieved from the rack 4 by the carrier 3 traveling in an area where the rack 4 faces. For example, the rack 4b faces the traveling area and the carrier 3 stores and retrieves a load 15. On the other hand, the rack 4a faces another traveling area and the carrier 3 stores and retrieves a load 15.

Figure 4:
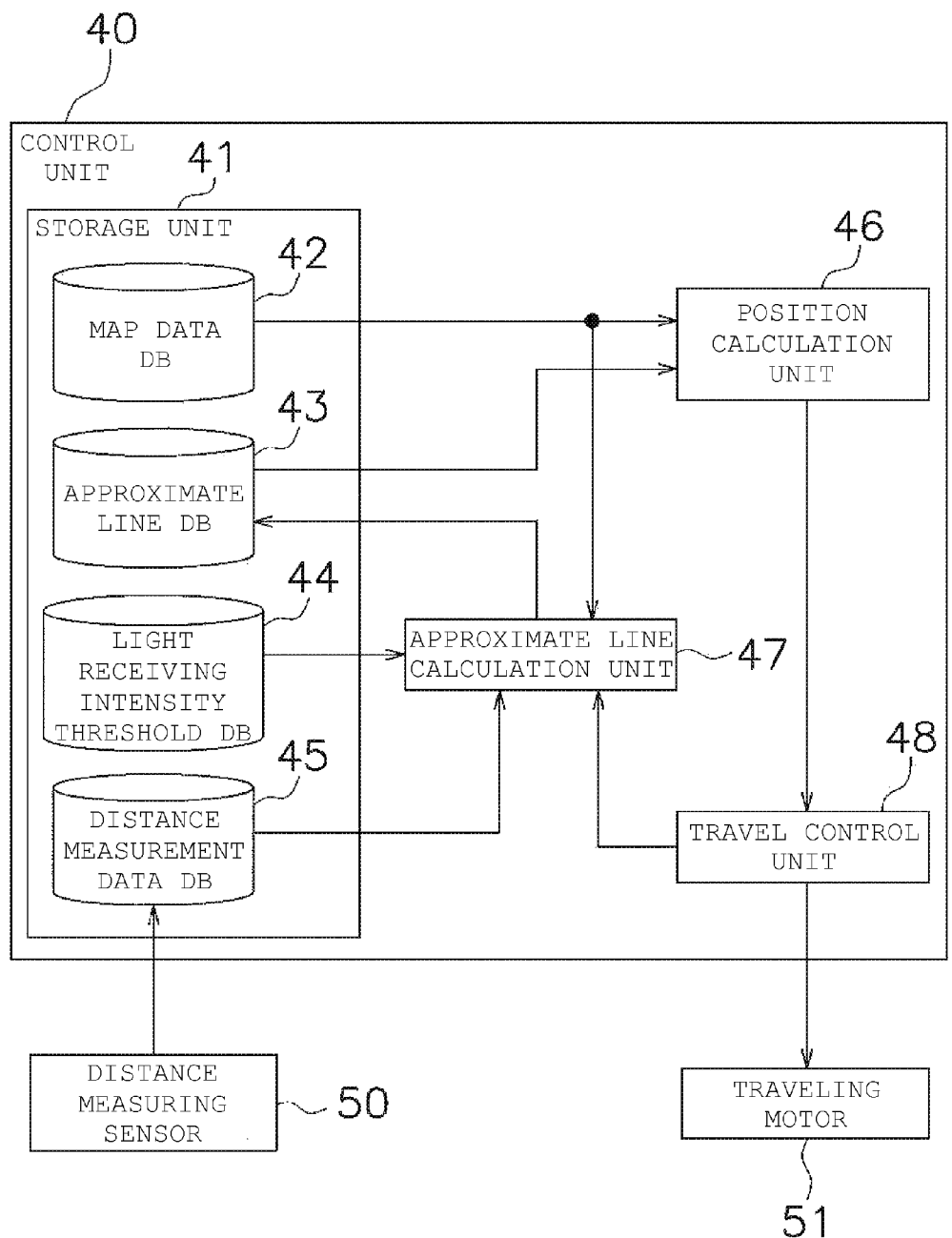
FIG. 4 is a block diagram illustrating a control configuration of a carrier.

The carrier 3 mainly includes a carrier main body 3a, a distance measuring sensor 50, and a controller 40 (refer to FIG. 4). The carrier main body 3a is able to travel on the pathway. The carrier main body 3a is provided with a traveling motor 51 (refer to FIG. 4) and traveling wheels 3b. In FIG. 1, an example of a traveling direction of the carrier 3 is illustrated by a thick arrow.

Figure 3:
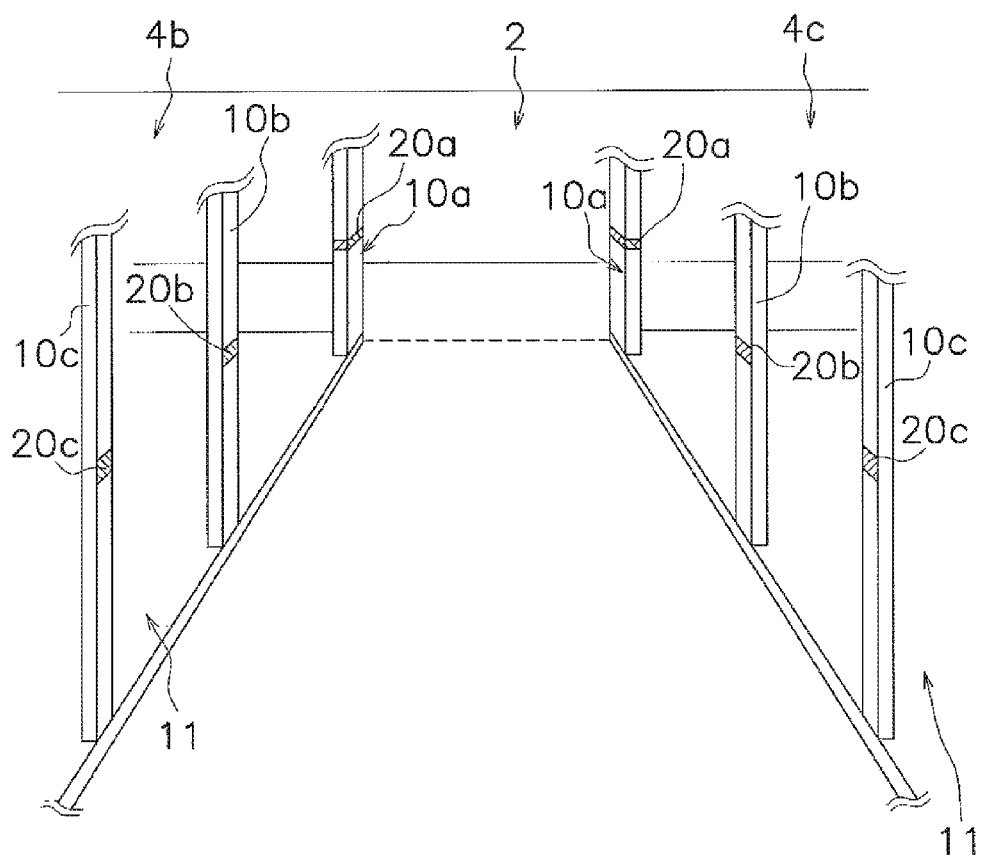
FIG. 3 is an explanatory view illustrating reflecting plates provided on columns of the racks.

Columns 10a, 10b, 10c, etc. and reflecting plates 20a, 20b, 20c, etc. of the rack 4 will now be described with reference to FIG. 3. FIG. 3 is an explanatory view illustrating reflecting plates provided on the columns of the racks.

The columns 10a, 10b, 10c, etc. of the racks 4b and 4c are arranged so as to face the traveling area. The columns 10a are positioned at the ends of the racks 4b and 4c.

As illustrated in FIG. 3, the column 10 of the rack 4 is, for example, a square column with four sides, one of which is parallel to an extending direction of the traveling area. The reflecting plate 20 may be provided at various positions. For example, the reflecting plate 20 may be provided at least on a side facing the traveling area or the reflecting plate 20 may be provided only on a side facing the traveling area.

As an example, the column 10a positioned at the end of the rack 4 is provided with the reflecting plates 20a on two sides, reflected light from which is able to be detected by the carrier 3 traveling in the traveling area.

The columns 10b, 10c, etc. at positions other than the end of the rack 4 are provided with the reflecting plates 20b, 20c, etc. on a side facing the traveling area.

A control configuration of the carrier 3 is now described with reference to FIGS. 1 and 4. FIG. 4 is a block diagram illustrating the control configuration of the carrier.

The carrier 3 includes a controller 40. The controller 40 preferably is a computer including a CPU, a RAM, and a ROM, and provides a travel control by executing predetermined programs. The controller 40 is connected to the distance measuring sensor 50, the traveling motor 51, and the like.

The distance measuring sensor 50 detects an obstacle that is in front of the carrier 3 in the traveling direction. More specifically, the distance measuring sensor 50 is provided in the carrier main body 3a, and measures the intensity of the reflected light a plurality of times to obtain a plurality of pieces of measured data. Still more specifically, the distance measuring sensor 50 preferably is a laser range finder. A laser transmitter transmits a laser pulse signal to a target and a laser receiver receives the laser pulse signal reflected from the target, where a distance is calculated based on the reflected laser pulse signal. The distance measuring sensor 50 scans laser light horizontally, for example, over a fan-shaped range of about 190 degrees, for example, in front of the carrier main body 3a by reflecting the emitted laser light with a rotating mirror. The scan cycle of the laser range finder is, for example, about 25 msec to about 100 msec.

The traveling motor 51 is a driver that provides a driving force for the traveling wheels 3b to run the carrier main body 3a.

The controller 40 includes a storage 41, a position calculator 46, an approximate line calculator 47, and a travel controller 48. In addition, the storage 41 includes a map data DB (database) 42, an approximate line DB 43, a light receiving intensity threshold DB 44, and a distance measurement data DB 45.

The map data DB 42 of the storage 41 stores map data on which the structures provided along the pathway are recorded, the map data indicating at least positions of the columns 10 of the rack 4. The map data may also indicate the position of the wall 2.

The approximate line DB 43 stores the approximate line calculated by the approximate line calculator 47.

The light receiving intensity threshold DB 44 stores the light receiving intensity threshold to determine whether the received light is reflected from the reflecting plate 20 or is reflected from something other than the reflecting plate 20.

The distance measurement data DB 45 stores the measured data indicating the light receiving intensity of the reflected light measured by the distance measuring sensor 50.

The approximate line calculator 47 calculates the approximate line based on the measured data measured by the distance measuring sensor 50.

The position calculator 46 identifies a current position of the carrier main body 3a by comparing the calculated approximate line with the map data. More specifically, the position calculator 46 calculates a reference point based on a set of measured data having a light intensity greater than or equal to a predetermined threshold among the plurality of pieces of measured data. The position calculator 46 then calculates a position of the carrier main body 3a by matching an approximate line (straight line) connecting a plurality of the sets to a straight line of the map data using the reference point (as described later).

The travel controller 48 controls the traveling motor 51 based on a given travel command and the current position.

Control operation using the controller 40 of the carrier 3 is described below.

Figure 5:
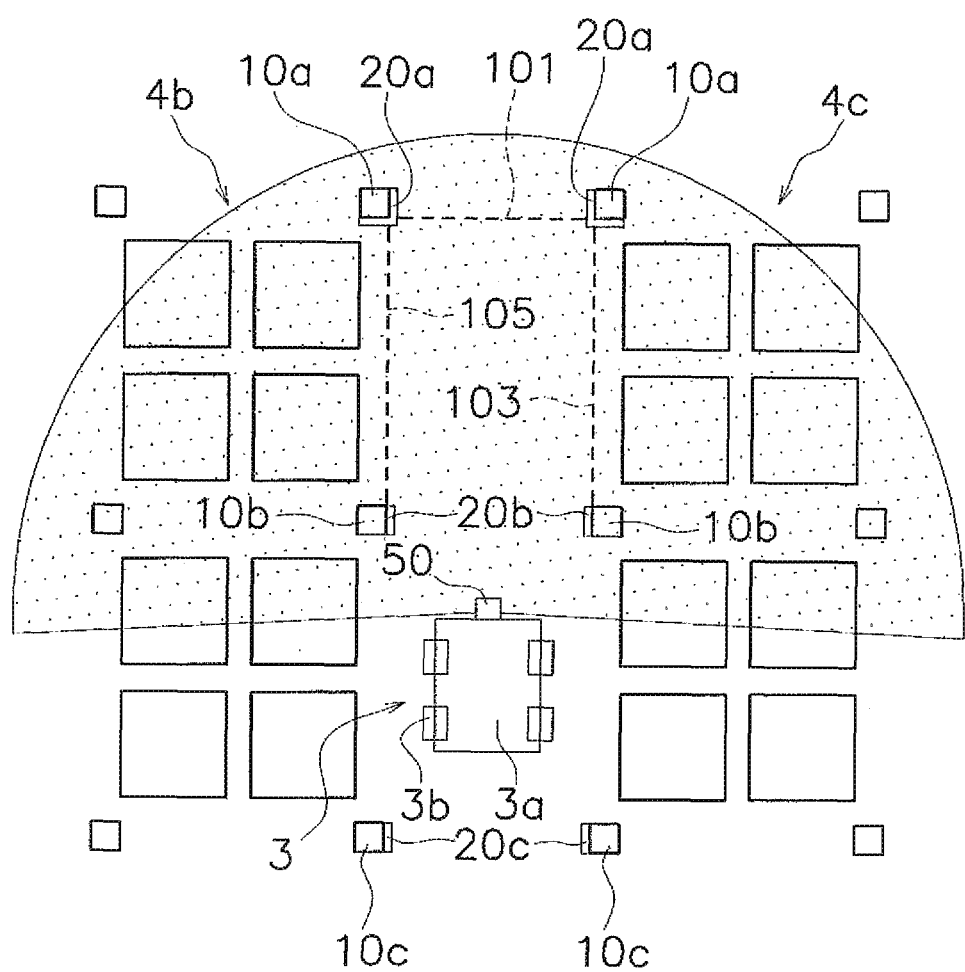
FIG. 5 is an explanatory view illustrating a state where reflected light is measured by a distance measuring sensor.
Figure 6:
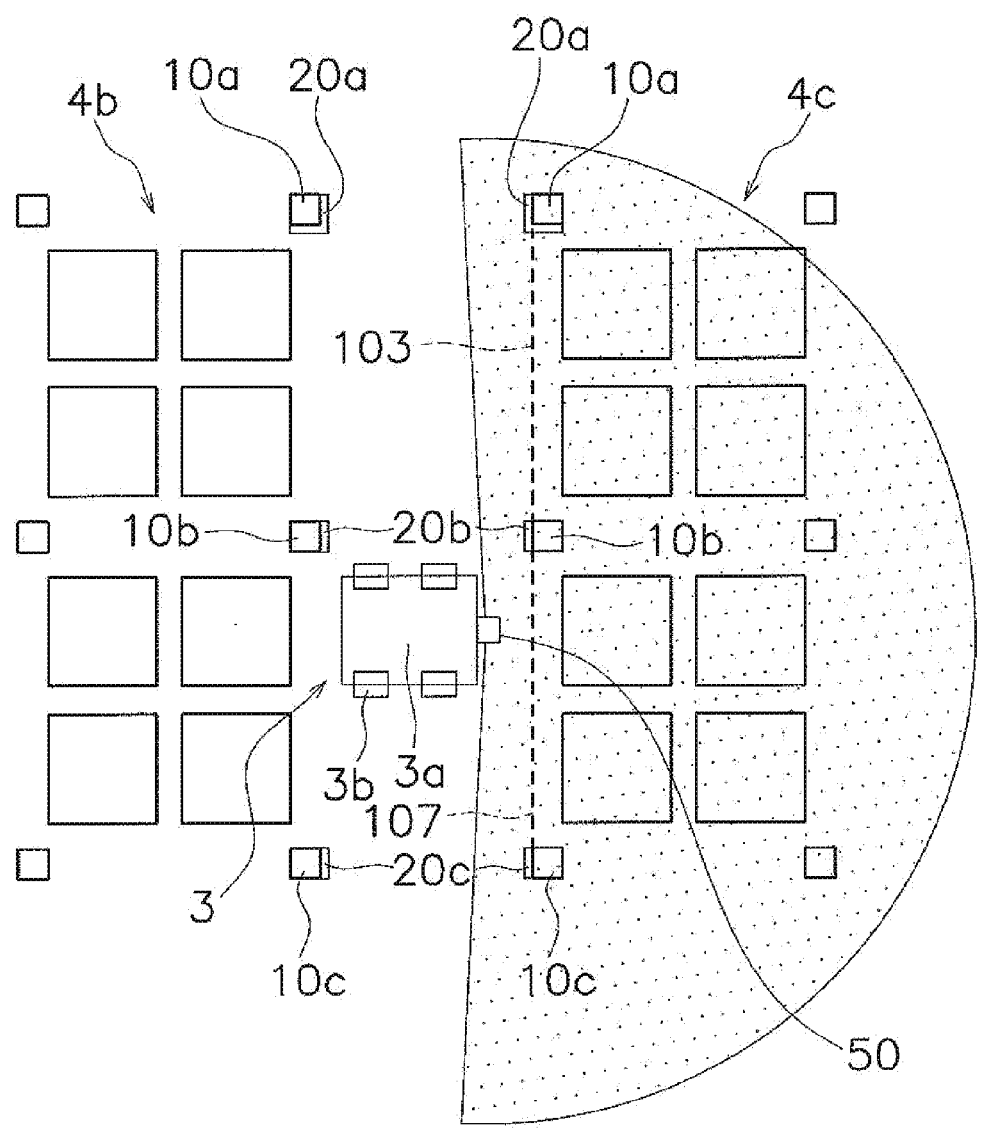
FIG. 6 is an explanatory view illustrating a state where reflected light is measured by the distance measuring sensor.

The distance measuring sensor 50 emits light and measures the light receiving intensity of all the reflected light. FIGS. 5 and 6 are explanatory views each illustrating a state where the reflected light is measured by the distance measuring sensor 50. In FIG. 5, the carrier 3 is directed upward, and the reflecting plates 20a of the two columns 10a and the reflecting plates 20b of the two columns 10b are in a sensing range of the distance measuring sensor 50. In FIG. 6, the carrier 3 is directed rightward, and the reflecting plate 20a of the column 10a, the reflecting plate 20b of the column 10b, and the reflecting plate 20c of the column 10c are in the sensing range of the distance measuring sensor 50.

When the carrier 3 travels in the traveling area, the distance measuring sensor 50 emits light forward, for example, over a range of about 190 degrees, for example, and measures the reflected light. Thus, the distance measuring sensor 50 measures the light receiving intensity of all the reflected light such as, for example, from the wall 2, the columns 10, the reflecting plates 20, and the loads 15.

The distance measurement data DB 45 stores the light receiving intensity of the reflected light measured by the distance measuring sensor 50 as measured data.

The approximate line calculator 47 first determines whether the carrier 3 is traveling along a predetermined area based on the map data of the map data DB 42 and travel data from the travel controller 48. For example, the approximate line calculator 47 determines in which traveling area the carrier 3 is positioned with respect to the initial position in the map data based on travel data including the speed and the traveling direction.

When determining that the carrier 3 is positioned in the predetermined traveling area, the approximate line calculator 47 selects measured data having a light intensity greater than or equal to the predetermined threshold among the plurality of pieces of measured data. The approximate line calculator 47 calculates the approximate line based on sets of selected measured data.

On the other hand, when determining that the carrier 3 is positioned in another traveling area, the approximate line calculator 47 does not select measured data and calculates the approximate line using all pieces of measured data. The another traveling area is, for example, a pathway facing the wall 2, and the distance measuring sensor 50 mainly measures the intensity of reflected light from the wall 2. Accordingly, the approximate line calculator 47 is able to calculate the approximate line corresponding to the wall 2. Note that the approximate line calculator 47 may calculate the approximate line using only the measured data along the wall 2 in the map data instead of using all pieces of measured data.

Figure 7:
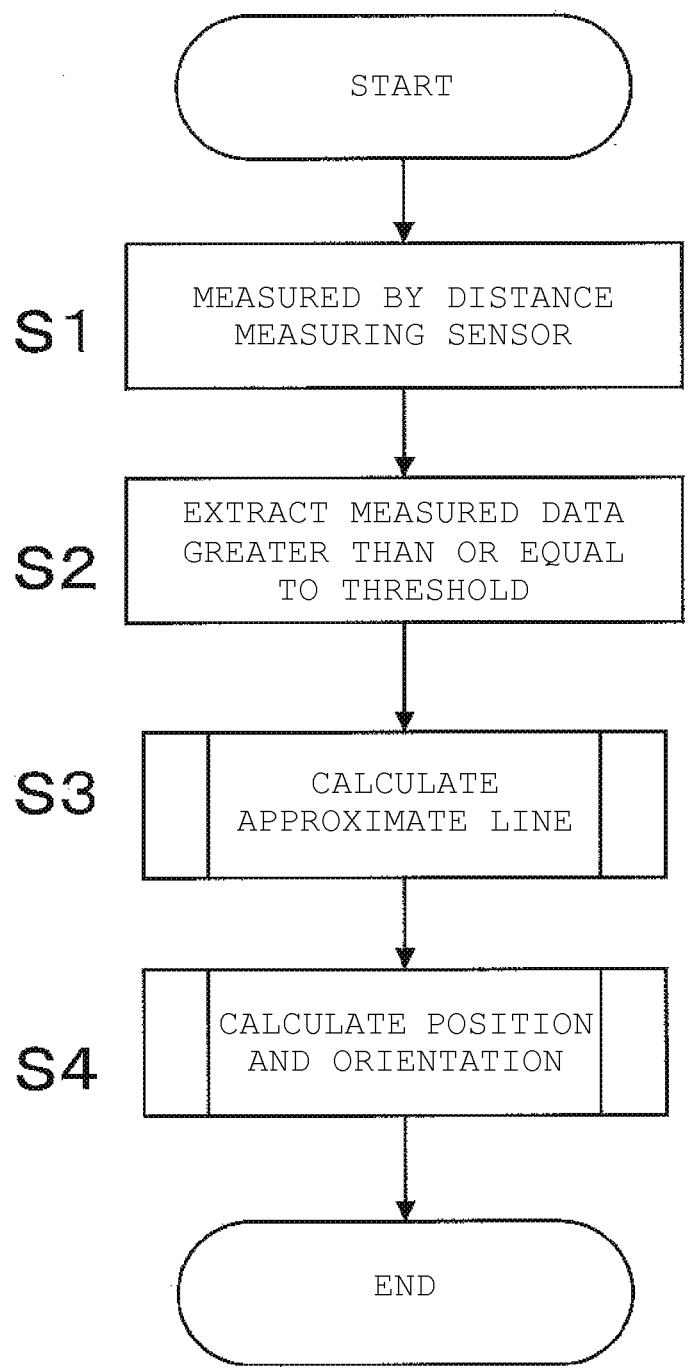
FIG. 7 is a flow chart illustrating a flow of processing of a preferred embodiment of the present invention.

Referring now to FIG. 7, details of calculating approximate lines in a traveling area, matching the approximate lines to map data, and calculating position and orientation are described. FIG. 7 is a flow chart illustrating the flow of processing of a preferred embodiment of the present invention. A step or steps of the flowchart can be omitted if necessary, and the order of the steps can be changed if necessary.

As illustrated in FIG. 6, the carrier 3 travels in the traveling area. At this time, the distance measuring sensor 50 measures the intensity of all the reflected light (step S1). For example, the reflected light from the reflecting plates 20a, 20b, and 20c of the racks 4b and 4c, the loads 15, and the like is measured, and the reflected light is stored in the distance measurement data DB 45.

The approximate line calculator 47 reads a predetermined threshold from the light receiving intensity threshold DB 44, where the predetermined threshold is a value used to determine whether or not the light is reflected from the reflecting plate 20.

The approximate line calculator 47 compares the measured data of the distance measurement data DB 45 with the predetermined threshold, and selects measured data greater than or equal to the predetermined threshold (step S2). For example, as illustrated in FIG. 5, only the measured data of the reflected light from the reflecting plates 20a and 20b of the racks 4b and 4c is extracted.

Subsequently, the approximate line calculator 47 calculates approximate lines from the extracted measured data (step S3). The approximate lines are stored in the approximate line DB 43.

In addition, the position calculator 46 matches the approximate lines stored in the approximate line DB to the map data of the map data DB 42, and then calculates position and orientation of the carrier 3 based on the matched results (step S4).

Figure 8:
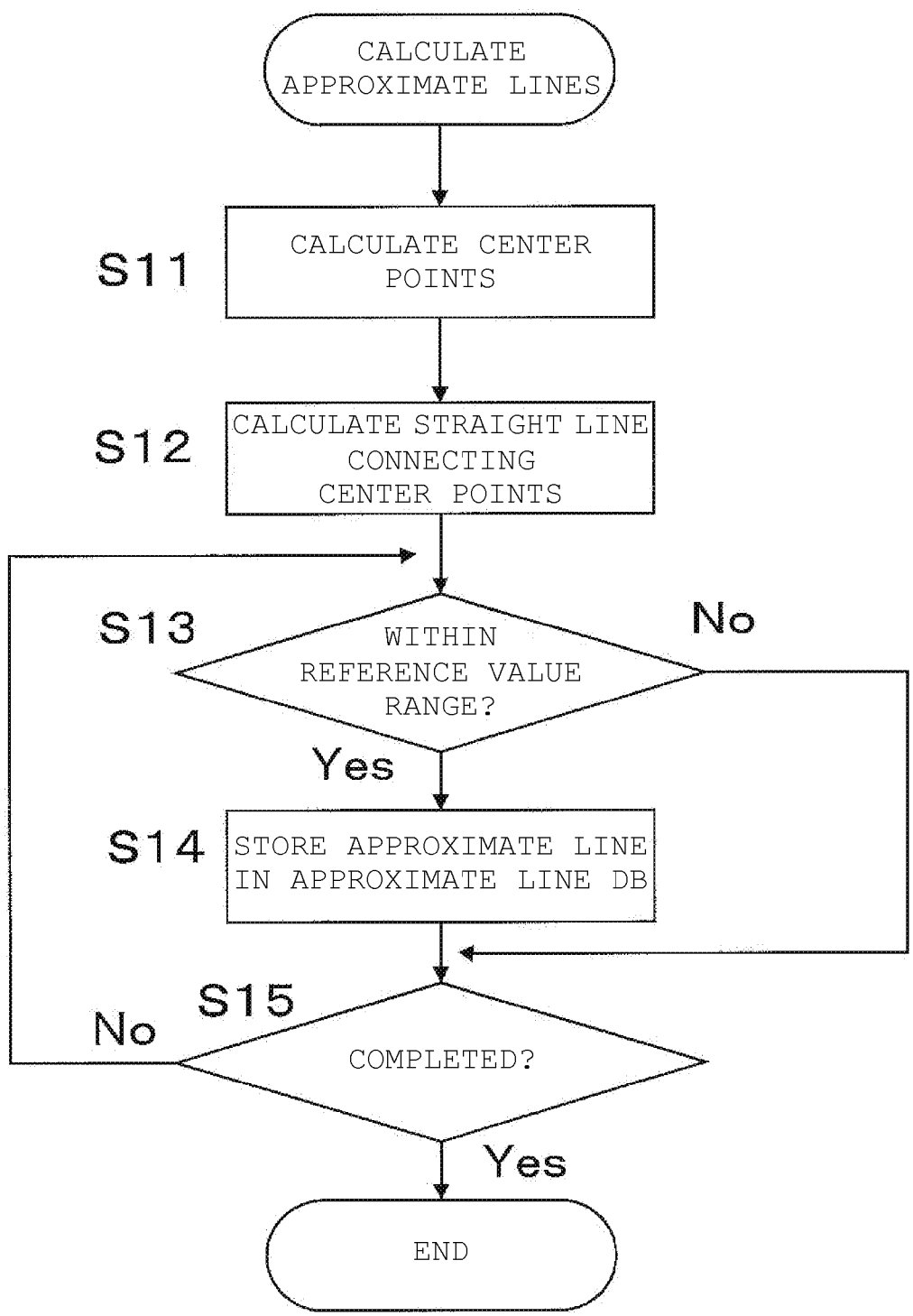
FIG. 8 is a flow chart illustrating a process for calculating approximate lines.
Figure 9B:
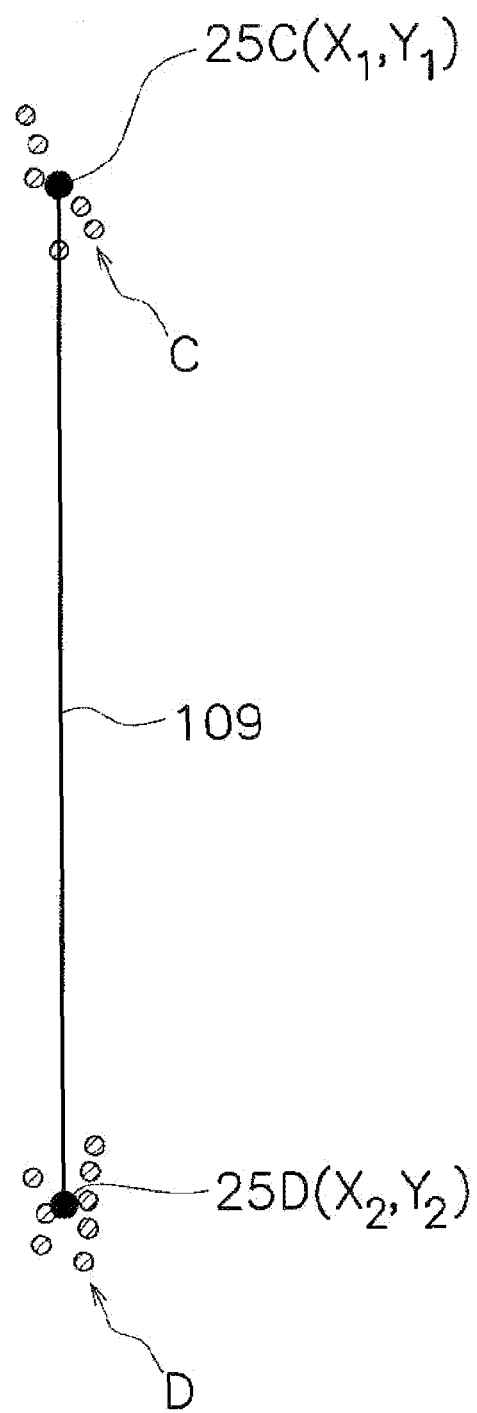

Referring now to FIG. 8 and FIGS. 9A and 9B, approximate line calculation step S3 is described in detail. FIG. 8 is a flow chart illustrating a process for calculating approximate lines. FIGS. 9A and 9B are explanatory views illustrating sets of measured data used to calculate the approximate line in the traveling area, where FIG. 9A illustrates the sets of measured data and FIG. 9B illustrates the approximate line.

As illustrated in FIG. 9A, a plurality of pieces of measured data 25 are distributed along the reflecting plate 20b of the column 10b and the reflecting plate 20c of the column 10c.

In FIG. 9A, sets C and D corresponding to the columns 10b and 10c of the rack 4b, respectively, are illustrated as sets of measured data 25 greater than or equal to the predetermined threshold. Since the reflecting plate 20 is provided to only one side of each of the columns 10b and 10c, the pieces of measured data 25 are distributed along the one sides of the columns 10b and 10c. The approximate line calculator 47 reads the positions of the columns 10b and 10c from the map data DB 42, where the pieces of measured data 25 in the vicinity of and corresponding to the columns 10b and 10c are denoted as the sets C and D, respectively.

As illustrated in FIG. 9B, the approximate line calculator 47 calculates a center point 25C by calculating average coordinates of the plurality of pieces of measured data 25 in the set C. The approximate line calculator 47 also calculates a center point 25D by calculating average coordinates of the plurality of pieces of measured data 25 in the set D (step S11).

As illustrated in FIG. 9B, the approximate line calculator 47 calculates an approximate line 109 connecting the center point 25C and the center point 25D (step S12). The approximate line (straight line) may be calculated by a method other than connecting the center points.

Figure 10:
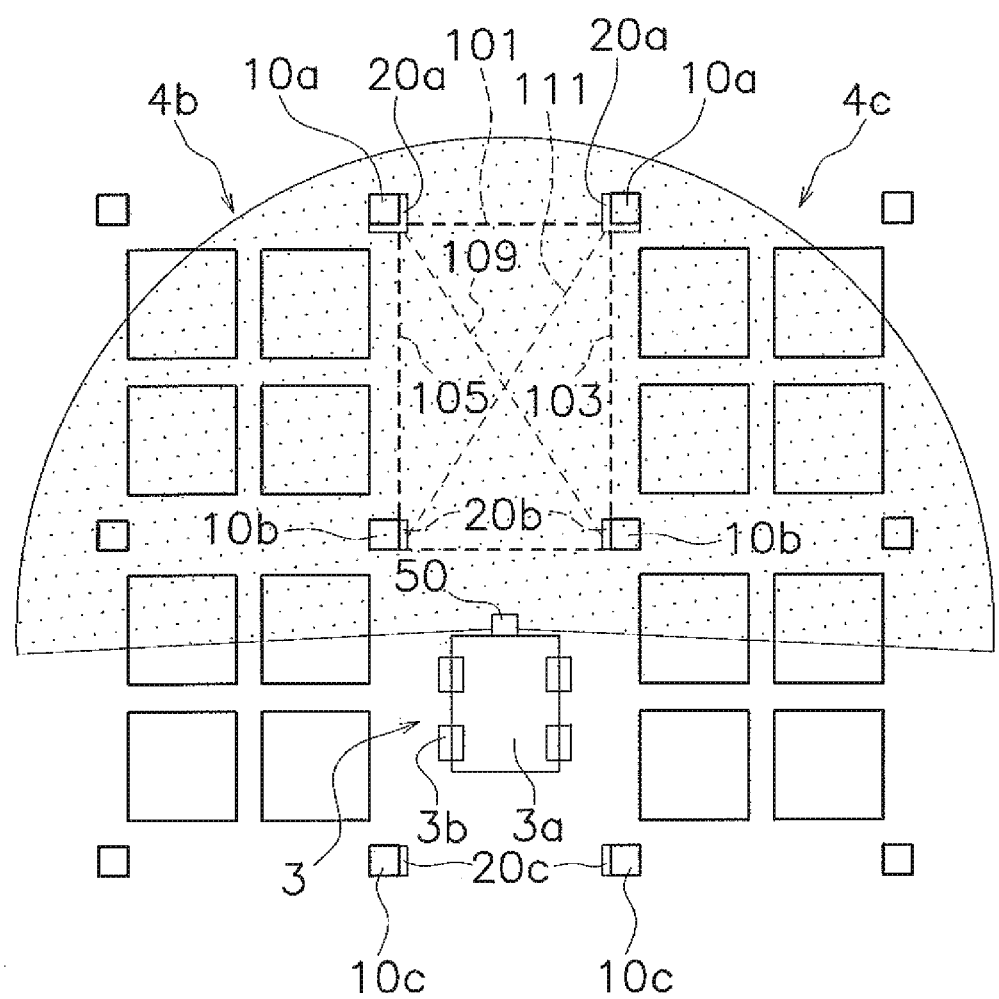
FIG. 10 is an explanatory view illustrating a state where reflected light is measured by the distance measuring sensor.

The approximate line calculator 47 then determines whether or not the approximate line 109 is within a reference value range (step S13). If the approximate line 109 is not within the reference value range, it means that the two detected points are not the columns to be measured. As illustrated in FIG. 10, for example, an approximate line 101 between the reflecting plates 20a and approximate lines 103 and 105 between the reflecting plates 20a and 20b arranged in the depth direction are to be recognized as columns making up a wall. However, approximate lines 109 and 111 between the reflecting plates 20a and 20b arranged in diagonal directions are not to be recognized as columns making up a wall. For example, when a range of lengths shorter than or equal to the length of the approximate lines 103 and 105 is set as a reference value range, the approximate lines 109 and 111 are not stored. All approximate lines may be stored without determining whether or not the approximate line 109 is within the reference value range.

If the approximate line 109 is within the reference value range (Yes in step S13), a process proceeds to step S14; if the approximate line 109 is outside the reference value range (No in step S13), the process skips step S14.

The approximate line calculator 47 stores the approximate line (i.e., the coordinates of the two center points) in the approximate line DB 43 (step S14).

The approximate line calculator 47 determines whether or not the determination of all approximate lines has been performed (step S15).

The process returns to step S13 if the determination has not been performed, while the process is completed when the determination has been performed.

One or more approximate lines based on the measured data are stored in the approximate line DB 43 by the process described above.

Figure 11:
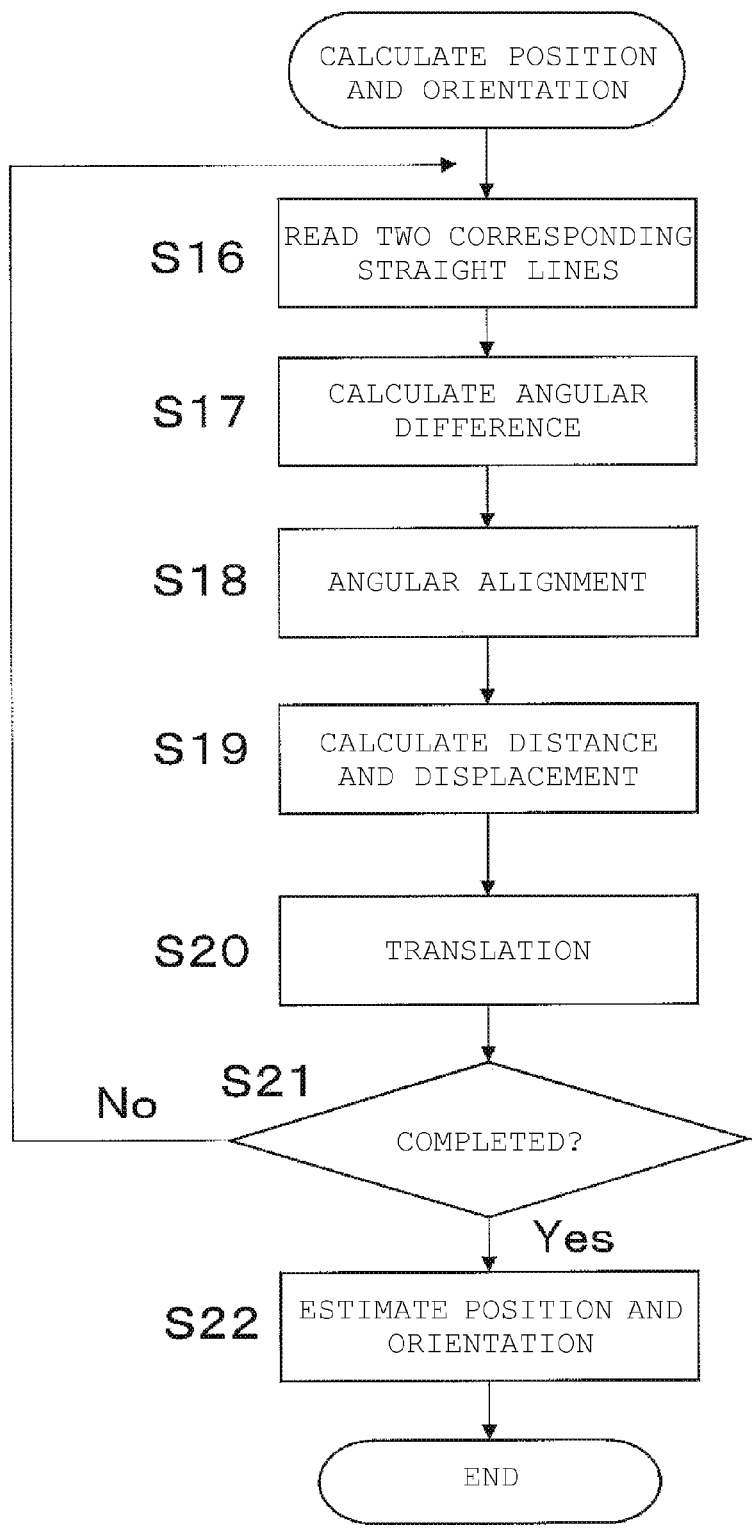
FIG. 11 is a flowchart illustrating a process for matching the approximate lines to map data.

A method of calculating a current position of the carrier main body 3a will now be described with reference to FIG. 11 and FIGS. 12A to 12D. FIG. 11 is a flow chart illustrating a process for matching the approximate lines to map data. FIGS. 12A to 12D are schematic diagrams illustrating angular alignment and translation of two straight lines.

The position calculator 46 reads, from the approximate line DB 43, one of the plurality of approximate lines calculated most recently. Subsequently, the position calculator 46 reads a straight line of the map data in the map data DB 42 (step S16). The straight line of the map data that is most likely to correspond to the approximate line is selected based on the coordinates of end points of the approximate line and rough current position information of the carrier. The map data includes data indicating at least the layout of the columns as illustrated in FIG. 9, and the straight line described above is a line segment connecting the positions of a pair of columns.

Figure 12A:
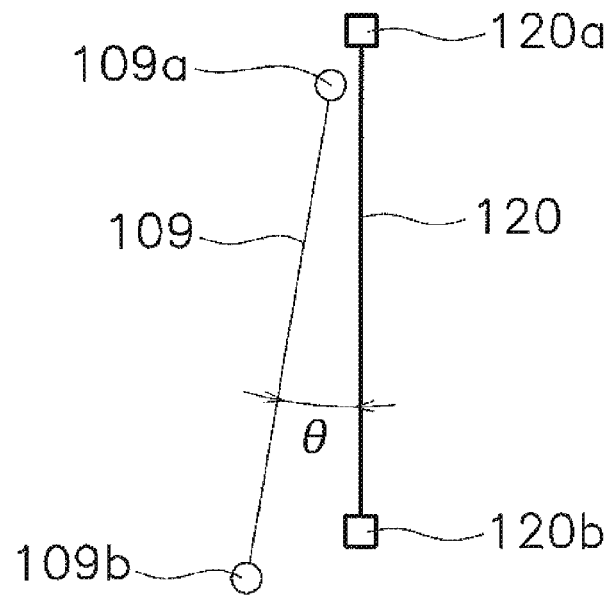
FIGS. 12A to 12D are schematic diagrams illustrating angular alignment and translation of two straight lines.
Figure 12B:
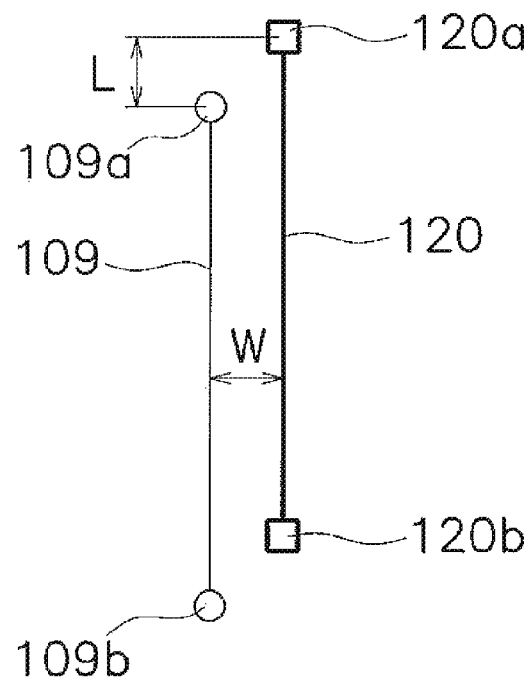

The position calculator 46 matches the approximate line to line segment information of the map data as illustrated in FIGS. 12A to 12D. That is, the approximate line and the straight line of the map data are fitted so as to coincide with each other. Specifically, the position calculator 46 calculates an angular difference θ between the approximate line 109 and a straight line 120 of the map data as illustrated in FIG. 12A (step S17). The position calculator 46 rotates the approximate line 109 so that the angle is consistent with the straight line 120 of the map data as illustrated in FIG. 12B (step S18). In other words, the sensor and the map are aligned in the same orientation.

The position calculator 46 then calculates a distance W and a longitudinal displacement L between the approximate line 109 and the straight line 120 of the map data (step S19).

Figure 12C:
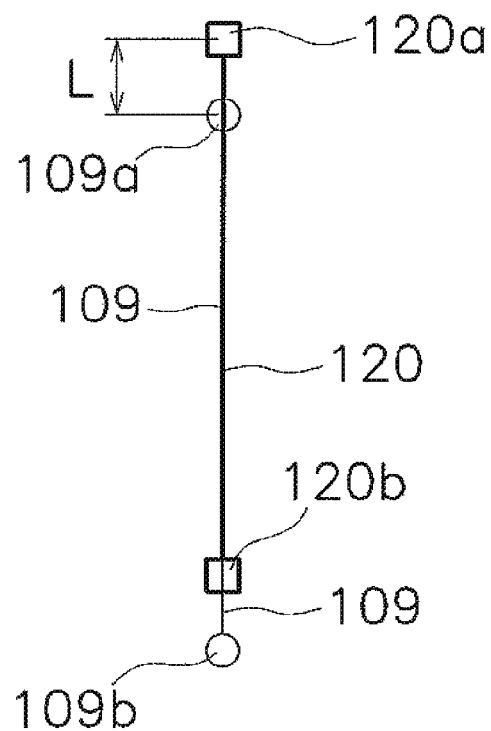
Figure 12D:
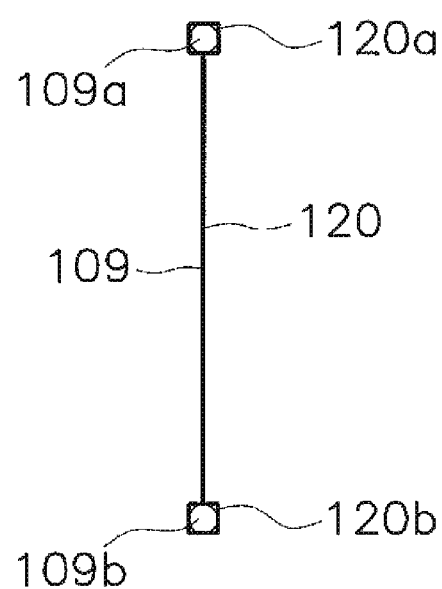

Subsequently, the position calculator 46 translates the approximate line 109 based on the above information so that the approximate line 109 coincides with the straight line 120 of the map data (step S20). The two line segments are first moved relatively so as overlap with each other as illustrated in FIG. 12C, and then moved relatively so as to coincide longitudinally with each other as illustrated in FIG. 12D. This movement is performed so that errors between the corresponding coordinates of the end points are smaller.

A method of matching two line segments is not limited to the above-described preferred embodiment.

It is determined whether or not all approximate lines of interest have been matched (step S21). The process proceeds to step S22 if all approximate lines have been matched (Yes in step S21), while the process returns to step S16 if all approximate lines have not been matched (No in step S21).

When all approximate lines have been matched, the position and the orientation of the carrier 3 are estimated (step S22). The position calculator 46 calculates the current position of the carrier main body 3a based on the matched results. Thus, the current position of the carrier 3 traveling in the traveling area can be identified accurately.

Note that other approximate lines are also considered in the angular alignment and the translation of straight lines after the first, and each angular alignment and translation is performed so that errors between the corresponding coordinates of the endpoints are smaller as a whole.

The travel controller 48 controls the traveling motor 51 based on the calculated current position and the travel command, and then causes the carrier 3 to travel.

The carrier 3 (an example of the carrier) includes the carrier main body 3a (an example of the carrier main body), the distance measuring sensor 50 (an example of the distance measuring sensor), the map data DB 42 (an example of the map data storage), and the position calculator 46 (an example of the position calculator).

The carrier main body 3a is able to travel on the pathway. The distance measuring sensor 50 is provided in the carrier main body 3a, measures the intensity of reflected light a plurality of times to obtain the plurality of pieces of measured data 25. The map data DB 42 stores the map data on which columns (an example of the structures) provided along the pathway are recorded. The position calculator 46 calculates the center points 25C and 25D (an example of the reference points) based on the sets of measured data having a light intensity greater than or equal to the predetermined threshold among the plurality of pieces of measured data 25. The position calculator 46 then calculates a position of the carrier main body 3a by matching the approximate line 109 connecting the sets to the straight line 120 of the map data using the center points 25C and 25D.

In the carrier 3, the center points 25C and 25D are used to calculate the position of the carrier main body 3a by matching the approximate line 109 connecting the sets to the straight line 120 of the map data. Thus, the position calculator 46 is able to identify the position of the carrier main body 3a when the columns are arranged so as not to define a plurality of straight lines perpendicular to each other in the scanning area of the laser light.

When the wall 2 is scanned, a plurality of pieces of measured data are obtained along the wall. Thus, the approximate line calculator 47 calculates an approximate line using the plurality of pieces of measured data, and the position calculator matches the approximate line to the straight line of the map data. The above-described matching may or may not use the coordinates of the end points of the approximate line. If information on a corner of the wall 2 is available, matching is performed using the information on the corner.

When the pair of columns 10a and the pair of columns 10b are scanned as illustrated in FIG. 5, the approximate line 101 is matched based on the coordinates of the columns 10a and 10a. The approximate line 103 is matched based on the coordinates of the columns 10a and 10b on the right side of FIG. 5, and the approximate line 105 is matched based on the coordinates of the columns 10a and 10b on the left side of FIG. 5.

When the columns 10a, 10b, and 10c on the right side are scanned as illustrated in FIG. 6, the approximate line 103 is used to match based on the coordinates of the columns 10a and 10b, and the approximate line 107 is used to match based on the coordinates of the columns 10b and 10c.

Other Preferred Embodiments

Although a preferred embodiment of the present invention has been described above, the present invention is not limited to the above-described preferred embodiment, and various modifications can be made without departing from the gist of the present invention. In particular, a plurality of preferred embodiments and alternative preferred embodiments described herein can be optionally combined as necessary.

While a plurality of appropriate lines preferably are created and each of the appropriate lines is matched to the line segment of the map data in the above-described preferred embodiment, only one appropriate line may be created and matched to the line segment of the map data even if a plurality of appropriate lines can be created.

While a plurality of appropriate lines preferably are created and then each of the appropriate lines is rotated and translated in the above-described preferred embodiment, an entire set of the appropriate lines may be rotated and then translated.

While the measured data having a light intensity greater than or equal to a predetermined threshold preferably is obtained from the reflecting plate provided on the column in the above-described preferred embodiment, a method or device that obtains the measured data is not limited thereto in particular.

Preferred embodiments of the present invention are widely applicable to a carrier that automatically travels on a travel pathway where surrounding objects are present.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A carrier comprising:
   a carrier main body that travels on a pathway;
   a distance measuring sensor that is provided in or on the carrier main body, and measures an intensity of reflected light a plurality of times to obtain a plurality of pieces of measured data;
   a storage that stores map data in which structures provided along the pathway are recorded; and
   a controller programmed or configured to:
      calculate respective reference points corresponding to respective sets of measured data with a light intensity greater than or equal to a predetermined threshold among the plurality of pieces of measured data,
      calculate a position of the carrier main body by matching a straight line connecting a plurality of the respective sets of the measured data to a straight line of the map data,
      connect a plurality of the respective reference points that are adjacent to each other in order to create the straight line connecting the plurality of the respective sets of the measured data, and
      control the carrier main body to automatically travel on the pathway based on the calculated position of the carrier main body.

2. The carrier according to claim 1, wherein the controller is programmed or configured not to use a straight line outside a predetermined length range as the straight line to be matched to the map data.

3. The carrier according to claim 1, wherein the respective reference points correspond to center points of each of the respective sets of the measured data having light intensity greater than or equal to the predetermined threshold among the plurality of pieces of measured data.

* * * * *